(12) United States Patent
Akers et al.

(10) Patent No.: US 11,941,625 B2
(45) Date of Patent: Mar. 26, 2024

(54) SYSTEMS AND METHODS FOR REAL-TIME CLASSIFICATION AND VERIFICATION OF DATA USING HIERARCHAL STATE MACHINES

(71) Applicant: JPMORGAN CHASE BANK, N.A., New York, NY (US)

(72) Inventors: Morgan Akers, Kirkland, WA (US); Timothy Rupp, Tacoma, WA (US)

(73) Assignee: JPMORGAN CHASE BANK, N.A., New York, NY (US)

(*) Notice: Subject to any disclaimer, the term of this patent is extended or adjusted under 35 U.S.C. 154(b) by 57 days.

(21) Appl. No.: 16/892,762

(22) Filed: Jun. 4, 2020

(65) Prior Publication Data
US 2020/0387900 A1 Dec. 10, 2020

Related U.S. Application Data

(60) Provisional application No. 62/856,879, filed on Jun. 4, 2019.

(51) Int. Cl.
*G06Q 20/40* (2012.01)
*G06F 16/906* (2019.01)
*G06Q 20/38* (2012.01)
*G06Q 40/02* (2023.01)

(52) U.S. Cl.
CPC ......... *G06Q 20/401* (2013.01); *G06F 16/906* (2019.01); *G06Q 20/382* (2013.01); *G06Q 40/02* (2013.01)

(58) Field of Classification Search
None
See application file for complete search history.

(56) References Cited

U.S. PATENT DOCUMENTS

| | | | |
|---|---|---|---|
| 9,092,766 B1* | 7/2015 | Bedier | G06Q 20/204 |
| 2010/0250731 A1* | 9/2010 | Xiao | H04L 63/0245 709/224 |
| 2011/0307433 A1* | 12/2011 | Dlugosch | G06N 5/02 706/45 |
| 2015/0350211 A1* | 12/2015 | Burgess | H04L 63/0823 726/30 |

(Continued)

*Primary Examiner* — Chrystina E Zelaskiewicz
(74) *Attorney, Agent, or Firm* — GREENBERG TRAURIG LLP

(57) ABSTRACT

Systems and methods for real-time classification and verification of data using hierarchal state machines are disclosed. According to one embodiment, in an information processing apparatus comprising at least one computer processor, a method for real-time classification and verification of data using at least one hierarchy of individual state machines may include: (1) receiving, from at least one external data source, incoming data to be stored in a data store; (2) reviewing the incoming data to identity a possibility of the incoming data including at least one type of sensitive information; (3) identifying a hierarchy of individual state machines to review the incoming data based on the at least one type of sensitive information; and (4) providing the incoming data to the hierarchy of individual state machines. The hierarchy of individual state machines review the incoming data for sensitive information in the type of sensitive information, and the hierarchy of individual state machines execute an action in response to the incoming data including sensitive information.

18 Claims, 3 Drawing Sheets

(56) References Cited

U.S. PATENT DOCUMENTS

| | | | |
|---|---|---|---|
| 2017/0171252 A1* | 6/2017 | Xue | H04L 65/1069 |
| 2018/0007049 A1* | 1/2018 | Palki | G06F 21/31 |
| 2019/0044976 A1* | 2/2019 | Smith | H04L 67/12 |
| 2019/0130257 A1* | 5/2019 | Meyerson | G06N 5/01 |
| 2019/0130308 A1* | 5/2019 | Chickering | G06N 20/00 |
| 2020/0234242 A1* | 7/2020 | Parks | G06F 8/34 |

* cited by examiner

SYSTEMS AND METHODS FOR REAL-TIME CLASSIFICATION AND VERIFICATION OF DATA USING HIERARCHAL STATE MACHINES

RELATED APPLICATIONS

This application claims the benefit of, and priority to, U.S. Provisional Patent Application Ser. No. 62/856,879, the disclosure of which is hereby incorporated, by reference, in its entirety.

BACKGROUND OF THE INVENTION

1. Field of the Invention

The present disclosure generally relates to efficient systems and methods for classifying incoming data, determining whether the data may be stored on a datastore of an organization based on the classification of incoming data, and performing actions on the system in response thereto.

2. Description of the Related Art

Organizations such as financial institutions typically process and store a plethora of data related to outside entities as part of its business as usual operations. This is true particularly for organizations that provide data services and infrastructure for third parties. Often such third-party data contains sensitive information, or information that may be required to be stored in a particular manner by the service organization, or not stored internally at all, because of, for example, applicable laws such as the General Data Protection Regulation (GDRP), the Payment Card Industry Data Security Standard (PCIDSS), confidentiality obligations and general data security purposes.

Organizations may not have a system in place to determine the extent to which the external data they receive needs to be stored in a particular manner, or not stored at all. For organizations that do, conventional techniques for addressing this issue typically involve verifying the data received from outside entities via a data audit. Such data audit processes, however, usually occur after data has been received by the organization; thus, detection of any discrepancies occurs after the fact and does not provide an organization with sufficient notice to store the data appropriately, or not store the data at all.

SUMMARY OF THE INVENTION

Systems and methods for real-time classification and verification of data using hierarchal state machines are disclosed. According to one embodiment, in an information processing apparatus comprising at least one computer processor, a method for real-time classification and verification of data using at least one hierarchy of individual state machines may include: (1) receiving, from at least one external data source, incoming data to be stored in a data store; (2) reviewing the incoming data to identify a possibility of the incoming data including at least one type of sensitive information; (3) identifying a hierarchy of individual state machines to review the incoming data based on the at least one type of sensitive information; and (4) providing the incoming data to the hierarchy of individual state machines. The hierarchy of individual state machines reviews the incoming data for sensitive information in the type of sensitive information, and the hierarchy of individual state machines execute an action in response to the incoming data including sensitive information.

In one embodiment, the type of sensitive information may include personally identifiable information, payment card information, account information, banking data.

In one embodiment, the incoming data may include at least one tag identifying the type of sensitive data.

In one embodiment, the type of sensitive information may be based on a region from where the incoming data is received, may be based on previous data received from the data source, etc.

In one embodiment, at least one of the individual state machines may be based on a regular expression.

In one embodiment, the method may further include prioritizing the plurality of state machines in the hierarchy based on the type of sensitive information.

In one embodiment, the incoming data may be provided to a plurality of hierarchies of individual state machines in parallel.

In one embodiment, the action may include generating an alert, preventing the sensitive data from being written to the data store, etc.

According to another embodiment, a system for real-time classification and verification of data using at least one hierarchy of individual state machines may include: at least one data source; a plurality of hierarchies of individual state machines executed by a server; a data store; and a computer program executed by at least one computer processor. The computer program may receive, from the at least one external data source, incoming data to be stored in the data store, may review the incoming data to identity a possibility of the incoming data including at least one type of sensitive information; may identify one of the hierarchies of individual state machines to review the incoming data based on the at least one type of sensitive information; and may provide the incoming data to the hierarchy of individual state machines. The hierarchy of individual state machines may review the incoming data for sensitive information in the type of sensitive information; and may execute an action in response to the incoming data including sensitive information.

In one embodiment, the type of sensitive information may include at least one of personally identifiable information, payment card information, account information. and banking data.

In one embodiment, the data may include at least one tag identifying the type of sensitive data.

In one embodiment, the type of sensitive information may be based on a region from where the data is received, on previous data received from the data source, etc.

In one embodiment, one or more of the individual state machines may be based on a regular expression.

In one embodiment, the computer program may prioritize the plurality of state machines in the hierarchy based on the type of sensitive information.

In one embodiment, the action may include generating an alert, preventing the sensitive data from being written to the data store, etc.

According to another embodiment, a computer implemented method for preventing inadvertent storage of sensitive data from an external computing device to an internal system may include receiving, by an internal server comprising at least one computer processor, data from the external computing device; analyzing, by a hierarchal state machine the data; wherein the hierarchal state machine includes a plurality of state machines, each state machine specifying a criteria; preventing storage of the data in the internal server if any criteria specified by the hierarchal state machine is met; and permitting storage of the data in the internal server if none of criteria specified by the hierarchal state machine is met.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF PREFERRED EMBODIMENTS

Embodiments disclosed herein are generally directed to systems and methods for analyzing, in real-time, whether external data may be stored in an internal datastore. Embodiments may include, for example, converting rules relating to the classification of data into state machines, and then storing the state machines in a manner so that multiple state machines may be applied very quickly (e.g., in parallel), to incoming data packets. An evaluation of incoming data occurs at the time of data receipt, and before the data is stored by the organization.

Figure 1:
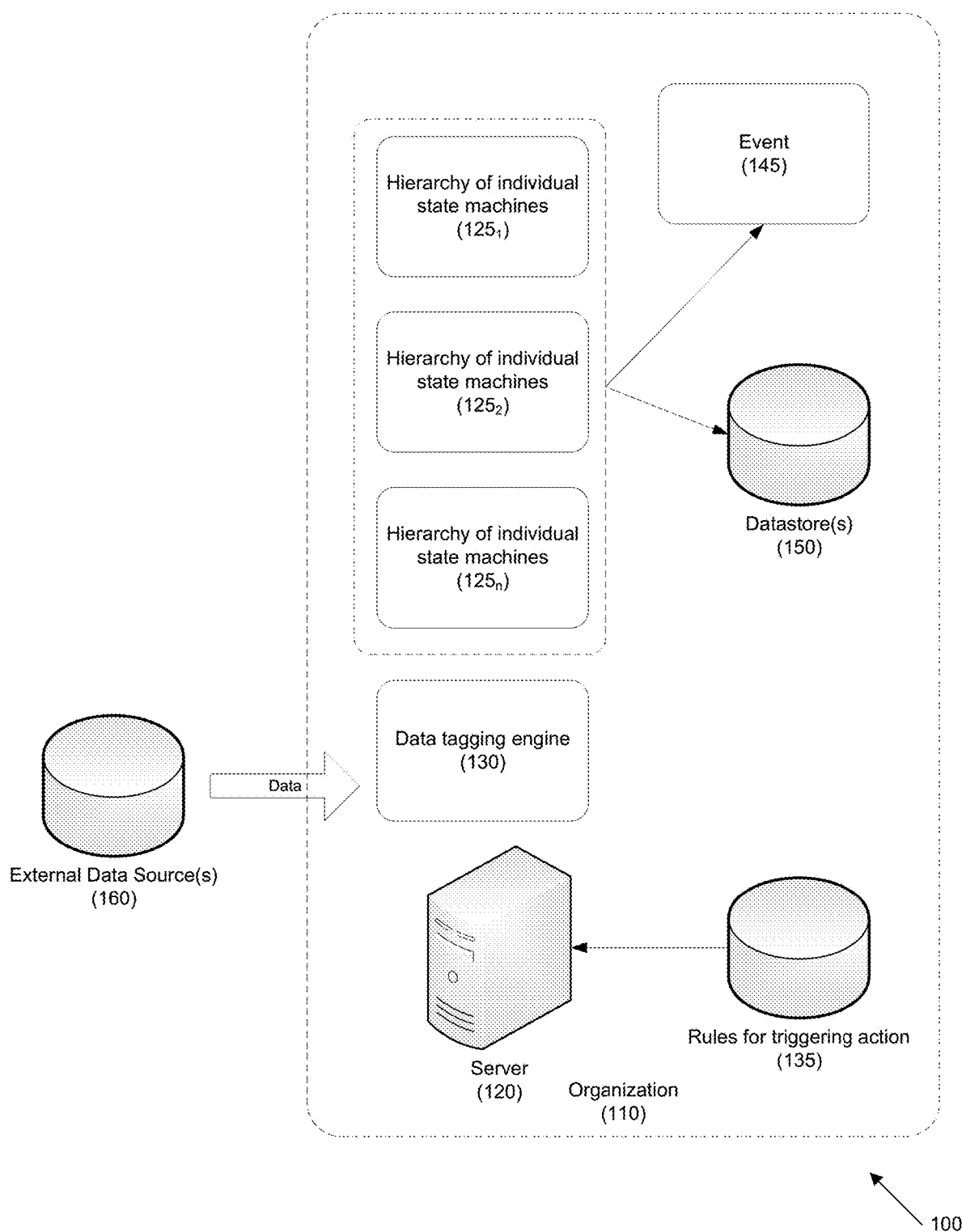
FIG. 1 depicts a system for real-time classification and verification of data using hierarchal state machines according to one embodiment.

Referring to FIG. 1, a system for real-time classification and verification of data using hierarchal state machines is disclosed according to one embodiment. System 100 may include one or more external data source(s) 160, which may provide any suitable data to organization 110.

Data from external data source(s) 160 may be provided to organization 110 via an Application Programming Interface (API) server to server read, write, and/or call functions. Organization 110's customer (e.g., the entity providing the data from the external data source(s) 160), for example, may be attempting to transmit data to server 120 via an API write functionality. Any other suitable mechanism for receiving data may be used as is necessary and/or desired.

Organization 110 may include server 120 that may execute one or more hierarchy of individual state machines $125_1$, $125_2$, ... $125_n$ and data tagging engine 130. Data tagging engine 130 may receive data from external data source(s) 160 and may identify one or more criteria used to select the one or more hierarchy of individual state machines $125_1$, $125_2$, ... $125_n$ to review the data.

In one embodiment, data tagging engine 130 may receive the criteria from an operator (e.g., the data from external data source(s) 160 may be tagged with the criteria, a human within organization 110 may identify the criteria by reviewing the incoming data, etc.), or it may determine the criteria from the content of the data, the source of the data, etc. For example, data tagging engine 130 may scan incoming data for forms of sensitive information, such as a personally identifiable information, sensitive business information, country specific data, and the like, and may then select and/or create one or more hierarchy of individual state machines 125 based on the criteria. For example, if a customer operates in Germany, that requires that no personally identifiable information of its citizens to be stored by an organization's database, data tagging engine 130 may implement one or more hierarchy of individual state machines 125 that prioritizes (sets at a higher hierarchy) state machines that contain search criteria for searching for the names of German surnames, compared to other lower priority individual state machines that search for Chinese surnames.

The organization or priority of the individual state machines within the hierarchy may be derived from the information found in the incoming data. For example, if the country or origin is identified from the incoming data, the system may reduce the individual state machines to use based on that country or the length or based on a characteristic (e.g., a particular length or composition) of a secure parameter commonly used in the country.

Server 120 may receive rules for triggering action 135. Based on the rules for triggering action 135, one or more hierarchy of individual state machines $125_1$, $125_2$, ... $125_n$ may classify data from external data source(s) 160 and, based on rules for triggering action 135, may refuse the data, or may store the data in one or more datastore(s) 150, or may take any other suitable action. For example, if the data is determined to include credit card numbers, the rule may specify that the action is to prevent writing the credit card numbers to one or more datastore(s) 150.

Rules for triggering action 135 may include programming instructions for triggering one or more hierarchy of individual state machines $125_1$, $125_2$, ... $125_n$ in response to the receipt and review of data from external data source(s) 160. For example, rules for triggering action 135 may include executing one or more hierarchy of individual state machines $125_1$, $125_2$, ... $125_n$ based on organization 110 receiving data from a particular external data source 160 (e.g., a particular vendor or customer), by a particular API call, whether sensitive information (e.g., PII data, credit card information, bank account information, etc.) is present in the data, etc.

Server 120 may execute one or more hierarchies of individual state machines $125_1$, $125_2$, ... $125_n$, each of which may include a plurality of individual state machines. In one embodiment, each individual state machine may be a component that can change from one state to another in response to an external input. State machines are typically faster than conventional programming techniques because they require less memory to implement, as only the state of the particular machine is recorded. In a hierarchy of state machines 125, multiple individual state machines may be run on a set of data in parallel, compared to traditional programming implementation that requires one rule or classification to be iterated over a set of a data one at a time, before other rules or classifications can be checked against the set of data. Each of the state machines may be stored in a tree that is traversed based on the input and outputs to filter to the state machines to use to evaluate the inputs.

In one embodiment, the individual state machines may use any suitable automata theory. For example, a state machine may be based on, the Mealy architecture, the Moore architecture, a finite state machine (FSM), a deterministic FSM (DFSM), a bit parallel state machine (BPSM), etc. Other architectures may be used as is necessary and/or desired.

In one embodiment, the individual state machines may be organized into hierarchies using both the metadata about the individual state machine input types (string, numeric, mixed), length of input (>50 chars, <10), classification of client (line of business, PCI compliance), source of data (e.g., United States, European Union, etc.), etc. Any suitable criteria may be used as is necessary and/or desired.

In one embodiment, one or more hierarchy of individual state machines $125_1$, $125_2$, ... $125_n$ may be mastered in a separate system. Once mastered, one or more hierarchy of individual state machines $125_1$, $125_2$, ... $125_n$ may be loaded onto server 120, where one or more hierarchy of individual state machines $125_1$, $125_2$, ... $125_n$ may analyze data from external data source(s) 160, before the data from external data source(s) 160 is written onto datastore(s) 150. Depending on rules for triggering action 135, certain of the individual state machines may be loaded into memory of the server 120 for processing data from external data source(s) 160.

In response to one or more hierarchy of individual state machines $125_1$, $125_2$, ... $125_n$ recognizing sensitive information (e.g., PII data, credit card information, bank account information, etc.), event 145 may be triggered. Event 145 may include generating an alarm or notification to alert organization 110 that the data from external data source(s) 160 contains sensitive information. Event 145 may also prohibit data from external data source(s) 160 being written to datastore(s) 150. A notification log may be used to document which external data source(s) 160 are sending confidential information.

Figure 2:
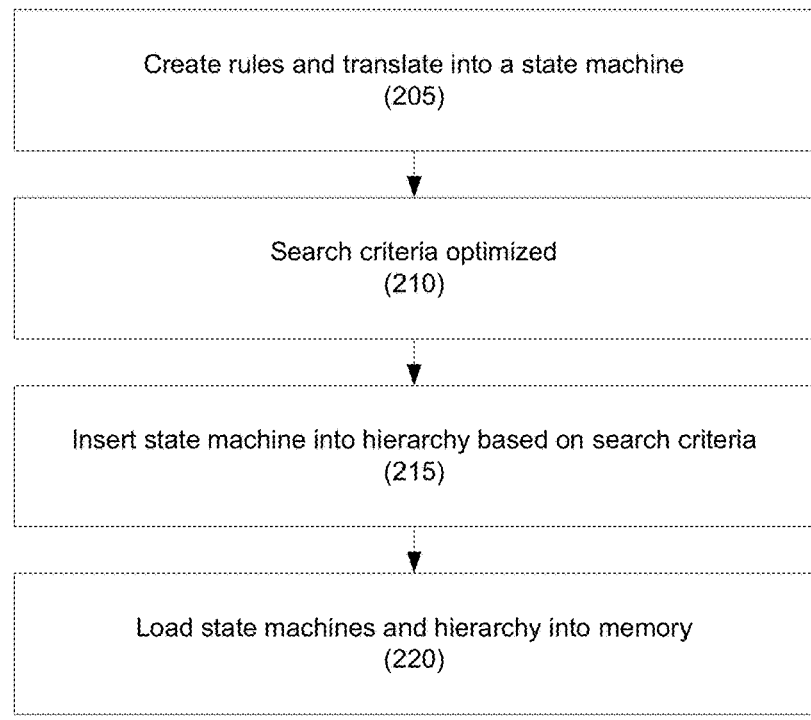
FIG. 2 illustrates a method for creating and deploying hierarchal state machines according to one embodiment.

Referring to FIG. 2, a method for creating and loading hierarchal state machines onto an organization's server is disclosed according to one embodiment.

In step 205, rules for establishing a hierarchy of state machines may be identified. Rules may relate to anticipated characteristics or features of incoming data. For example, particular rules may include consideration of the length of strings in a data packet, the types of characters within a string, or the frequency, and order of such characters within a string, caller of the API of the data, the size of the data, the anticipated content of the data, etc.

In one embodiment, regular expressions, or "regexes" may be used to create the rules. For example, regexes for social security numbers or their equivalents, credit card numbers, dates of birth, credit card numbers, banking account numbers, etc. may be used to define individual state machines. Each state machine may be specific to a regex. In one embodiment, a plurality of state machines may be directed to a different aspect part of a regex, as a regex may have multiple criteria.

By way of example, a first state machine for determining that the data contains a social security number may identify portions of incoming data that include a string of nine characters. A second state machine may require all characters in the string are numbers (e.g., not in alphabetical characters).

In one embodiment, a plurality of individual state machines may each be defined for a specific rule, and may be organized into hierarchal structures, or nodal lists. Each node of a hierarchal state machine may be analyzed in parallel to maximize the efficiency in which data is classified.

In step 210, one or more criteria may be selected and optimized for organizing the hierarchal structure of the individual state machines. In another embodiment, the criteria may be used to select one or more hierarchies of individual state machines.

In step 215, the individual state machines may be organized in hierarchical structures based on the search criteria so to maximize the efficiency at which the data is classified and validated. For example, if the criteria considers whether incoming data includes a social security number(s), a first individual state machine in the hierarchy may determine whether a length of data strings contained in incoming data is 9 characters. This first individual state machine may be provided at a higher hierarchy level than a second individual state machine that triggers an event in response to the inputted data string containing only numbers. The first state machine thus filters incoming portions of the data that do not include data strings of nine characters in length pass, and thus increases efficiency by preventing the second state machine from having to process portions of data that do not meet the social security number format.

If the data is determined to not meet the social security number format, the next set of search criteria may select the individual state machines based on the sender of the data (they may use 8-12 digits for account numbers), or if there were previous state machines that determined Baltic countries were in the data the search looks for national ID state machines of length 11.

A third state machine may be provided at a lower hierarchy under the first state machine, but at the same level as the second state machine, and may specify for example, that the first string contains two alphabetic characters, and thus may determine if the string is a passport number, for example, as opposed to a social security number. Like the second state machine, the third state machine may either send an alert to a system administrator or developer of the organization, or prevent the storage of the incoming data containing the string in real-time if the criteria of the third state machine is met.

In step 220 the state machines and hierarchy may optionally be loaded onto memory of the server and may await the receipt of incoming information.

Figure 3:
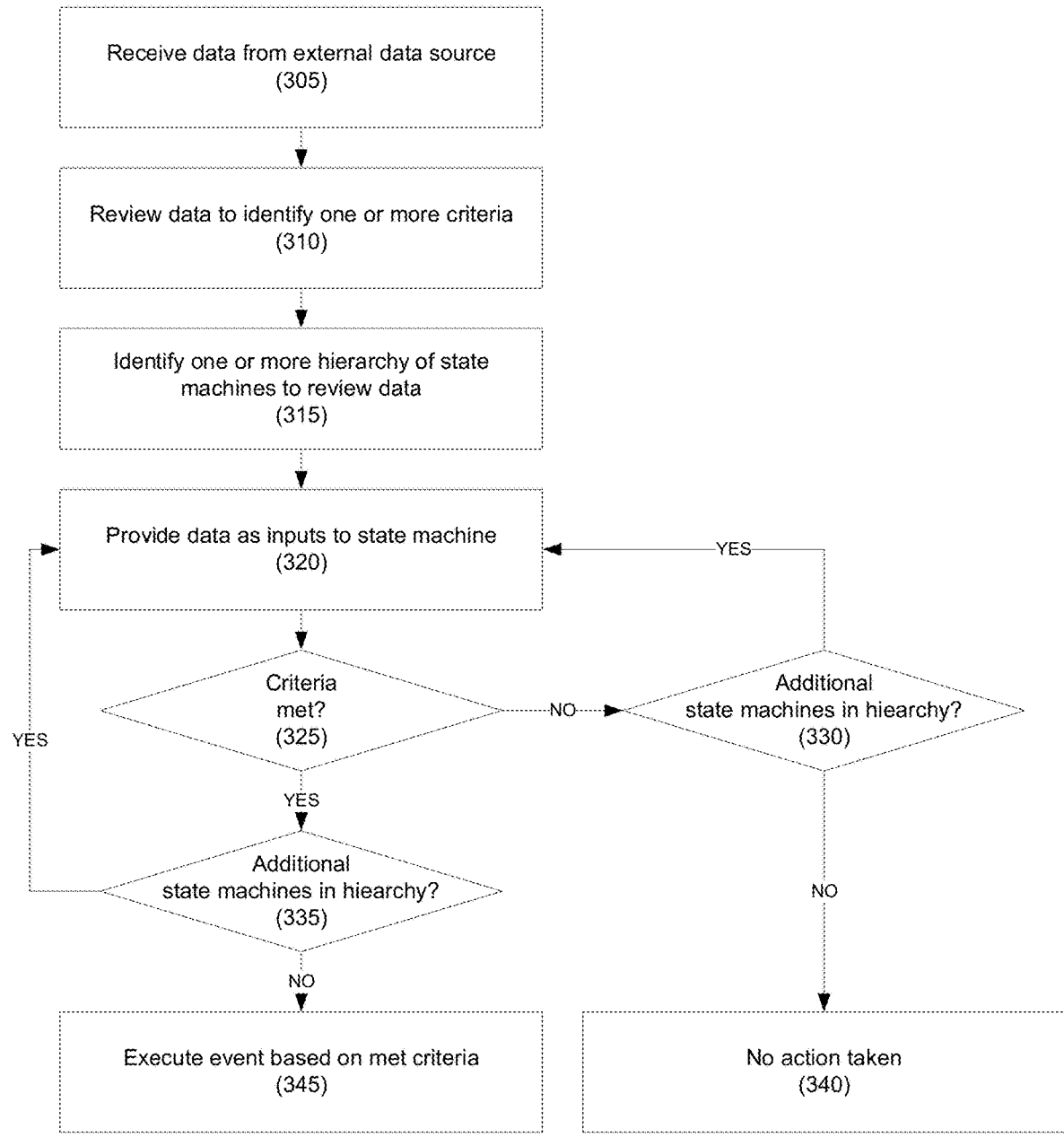
FIG. 3 illustrates a method for real-time classification and verification of data according one embodiment of the invention.

Referring to FIG. 3, a method for classifying incoming data from an external source using a hierarchal state machines, and performing actions based on the classification is disclosed according to one embodiment.

In step 305, an organization's system or server may receive external data from an external data source, such as a customer or other organization. Examples of external data may include banking records that may include sensitive information. Any other suitable type of external data may be received as is necessary and/or desired. Sensitive information may include social security numbers, account numbers, and other personally identifiable information. The receipt of the external data from a particular source (e.g., from a specific customer, or company) may be a rule for triggering an action that may cause the running of hierarchal state machines on the external data.

In step 310, the data may be reviewed for one or more criteria that may be used to optimize or select one or more hierarchy of individual state machines. In one embodiment, the one or more criteria may be in the data flow. In another embodiment, the one or more criteria may be determined by reviewing the data, such as by a data tagging engine. For example, the data may be reviewed to determine if it is likely to include PII data, PCI data, account information, etc.

Based on the one or more criteria, one or more hierarchy of individual state machines may be selected to receive and classify the data.

In one embodiment, machine learning may be used to identify the criteria. For example, if a customer provides data that typically includes social security numbers, the criteria may be selected that checks characteristics of the data relating to the social security number. The system may look at the metadata (e.g., the source, date, author) of the external data to determine which set of hierarchal state machines to use to review and classify the data.

In step 315, based on the criteria, one or more hierarchies of individual state machines may be selected. For example, in one embodiment, the hierarchies of individual state machines may be preexisting; in another embodiment, the hierarchies of individual state machines may be generated.

In one embodiment, the order of individual state machines within an existing hierarchy may be optimized based on the criteria, the data source, etc.

In step 320, the data may be provided to one or more identified hierarchies of individual state machines for evaluation. For example, the data may be provided to a plurality of hierarchies of individual state machines at a first level in a hierarchy. The criteria for each of the individual state machines may be based on a specific rule, e.g., that the packet contains text strings with 9 numbers, a regular expression for a social security number, etc.

In one embodiment, the plurality of individual state machines within the same hierarchy may evaluate the data in parallel.

In step 325, depending on whether the state machine's rule is met, the process may be routed to determine if any other state machines are in the hierarchy. For example, if the rule for the state machine is not met, and there are no additional state machines in the hierarchy, in step 340, no action may be taken. This may indicate that the data did not include any sensitive data that required additional actions.

If, in step 325, the rule is met, and there are no further state machines in the hierarchy, the event associated with the last state machine may be executed. This may indicate, for example, that the data includes sensitive data that requires additional actions, such as an alert, not storing the data, etc.

It should be recognized that although several embodiments have been disclosed, these embodiments are not exclusive and aspects of one embodiment may be applicable to other embodiments.

Hereinafter, general aspects of implementation of the systems and methods of the invention will be described.

The system of the invention or portions of the system of the invention may be in the form of a "processing machine," such as a general-purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

In one embodiment, the processing machine may be a specialized processor.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general-purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that are capable of implementing the steps of the processes of the invention.

The processing machine used to implement the invention may utilize a suitable operating system. Thus, embodiments of the invention may include a processing machine running the iOS operating system, the OS X operating system, the Android operating system, the Microsoft Windows™ operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instruction or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

It will be readily understood by those persons skilled in the art that the present invention is susceptible to broad utility and application. Many embodiments and adaptations of the present invention other than those herein described, as well as many variations, modifications, and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications, or equivalent arrangements.

What is claimed is:

1. A method for real-time classification and verification of data, comprising:

in an information processing apparatus comprising at least one computer processor:
  receiving, from a data source, incoming data;
  reviewing the incoming data to identify a plurality of features of the incoming data, wherein the plurality of features of the incoming data provide an indication that the incoming data includes a type of sensitive information;
  identifying a plurality of classification rules, wherein the plurality of classification rules classify the incoming data based on the plurality of features of the incoming data;
  selecting a plurality of individual state machines, wherein each individual state machine of the plurality of individual state machines is selected based on an association with a corresponding one of the plurality of classification rules, and wherein each individual state machine of the plurality of individual state machines undergoes a state change when input data triggers the corresponding one of the plurality of classification rules associated with the individual state machine;
  identifying a plurality of hierarchies of individual state machines from the plurality of individual state machines to review the incoming data, wherein an input data type of each of the individual state machines in the plurality of hierarchies of individual state machines is associated with one of the plurality of features of the incoming data, and wherein the individual state machines in each of the plurality of hierarchies of individual state machines are organized into a hierarchical tree structure based on the input data type of each of the individual state machines in each of the plurality of hierarchies of individual state machines;
  executing the plurality of hierarchies of individual state machines; and
  providing the incoming data as the input data to the plurality of hierarchies of individual state machines, wherein:
    the incoming data is provided to the plurality of hierarchies of individual state machines in parallel;

the incoming data traverses the hierarchical tree structure of each of the plurality of hierarchies of individual state machines as the input data; and at least one of the plurality of individual state machines undergoes the state change in response to the input data; and executing an action in response to the state change, wherein the action comprises preventing the type of sensitive information from being written to a data store.

2. The method of claim 1, wherein the type of sensitive information comprises personally identifiable information.

3. The method of claim 1, wherein the type of sensitive information comprises payment card information.

4. The method of claim 1, wherein the type of sensitive information comprises account information.

5. The method of claim 1, wherein the incoming data comprises banking data.

6. The method of claim 1, wherein the incoming data comprises at least one tag identifying the type of sensitive information.

7. The method of claim 1, wherein the type of sensitive information is based on a region from where the incoming data is received.

8. The method of claim 1, wherein the type of sensitive information is based on previous data received from the data source.

9. The method of claim 1, wherein at least one of the individual state machines is based on a regular expression.

10. The method of claim 1, further comprising:
prioritizing the individual state machines in the plurality of hierarchies of individual state machines based on the type of sensitive information.

11. The method of claim 1, wherein the action further comprises generating an alert.

12. A system for real-time classification and verification of data, comprising:
at least one server including a computer processor; and
a computer program executed by the at least one server wherein:
the computer program receives, from a data source, incoming data;
the computer program reviews the incoming data to identify a plurality of features of the incoming data, wherein the plurality of features of the incoming data provide an indication that the incoming data includes a type of sensitive information;
the computer program identifies a plurality of classification rules, wherein the plurality of classification rules classify the incoming data based on the plurality of features of the incoming data;
the computer program selects a plurality of individual state machines, wherein each individual state machine of the plurality of individual state machines is selected based on an association with a corresponding one of the plurality of classification rules, and wherein each individual state machine of the plurality of individual state machines undergoes a state change when input data triggers the corresponding one of the plurality of classification rules associated with the individual state machine;
the computer program identifies a plurality of hierarchies of individual state machines from the plurality of individual state machines to review the incoming data, wherein an input data type of each of the individual state machines in the plurality of hierarchies of individual state machines is associated with one of the plurality of features of the incoming data, and wherein the individual state machines in each of the plurality of hierarchies of individual state machines are organized into a hierarchical tree structure based on the input data type of each of the individual state machines in each of the plurality of hierarchies of individual state machines;
the computer program executes the plurality of hierarchies of individual state machines;
the computer program provides the incoming data as the input data to the plurality of hierarchies of individual state machines, wherein:
the incoming data is provided to the plurality of hierarchies of individual state machines in parallel;
the incoming data traverses the hierarchical tree structure of each of the plurality of hierarchies of individual state machines as the input data; and
at least one of the plurality of individual state machines undergoes the state change in response to the input data; and
the computer program executes an action in response to the state change, wherein the action comprises preventing the type of sensitive information from being written to a data store.

13. The system of claim 12, wherein the type of sensitive information comprises at least one of personally identifiable information, payment card information, account information, and banking data.

14. The system of claim 12, wherein the incoming data comprises at least one tag identifying the type of sensitive information.

15. The system of claim 12, wherein the type of sensitive information is based on at least one of a region from where the incoming data is received and on previous data received from the data source.

16. The system of claim 12, wherein at least one of the individual state machines is based on a regular expression.

17. The system of claim 12, wherein the computer program prioritizes the individual state machines in the plurality of hierarchies of individual state machines based on the type of sensitive information.

18. The system of claim 12, wherein the action further comprises generating an alert.

* * * * *